Patented Dec. 12, 1944

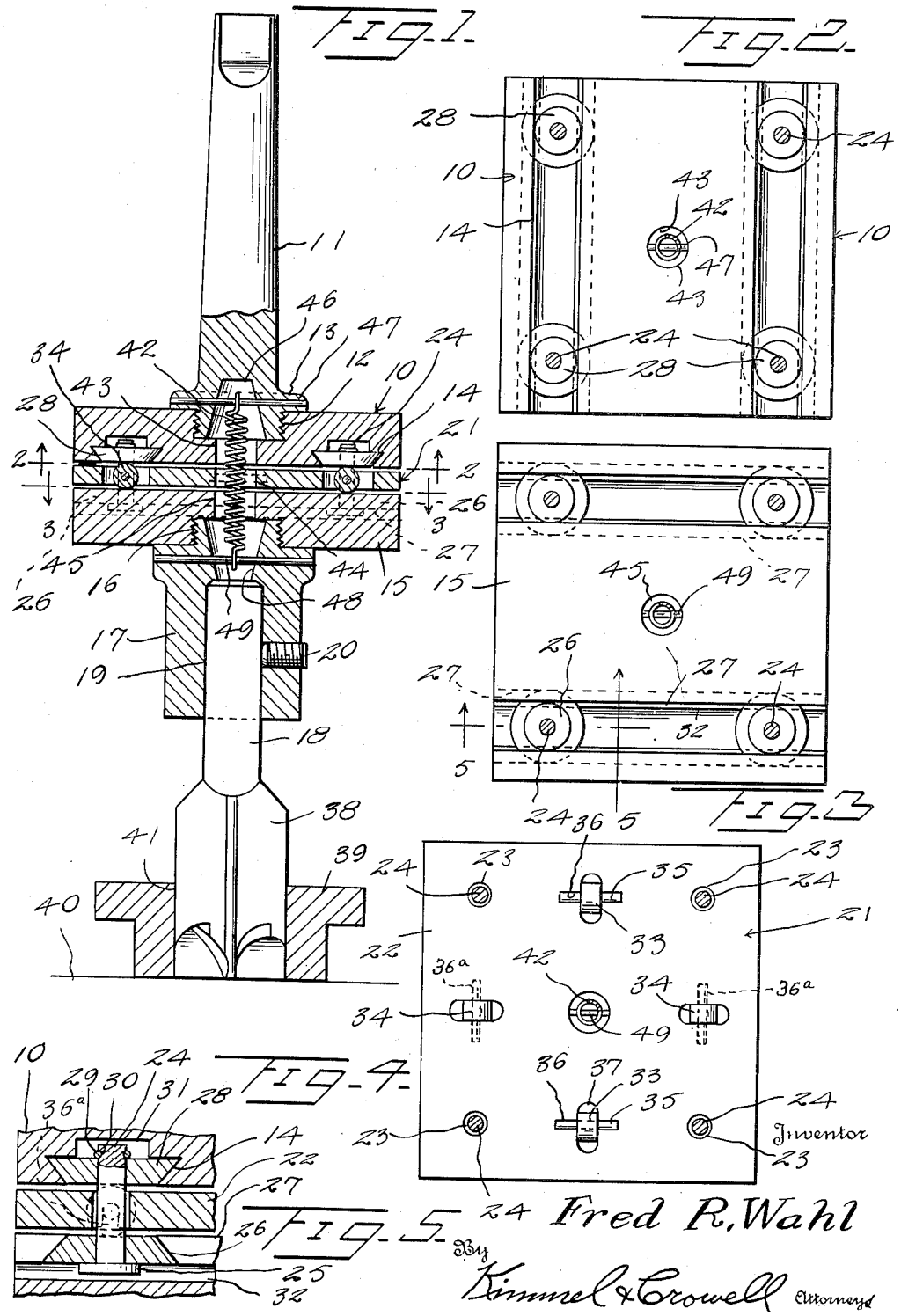

2,365,128

UNITED STATES PATENT OFFICE 2,365,128

SQUARE HOLE DRILL

Fred R. Wahl, Chicago, Ill.

Application November 8, 1943, Serial No. 509,501

7 Claims. (Cl. 77—61)

This invention relates to drill chucks for holding drill bits for polygonal holes.

An object of this invention is to provide an improved chuck or holder for a drill bit, whereby the bit can have substantially universal movement in a horizontal plane.

Another object of this invention is to provide a chuck which includes opposed plates having angularly related channels or keyways in which pairs of rollers are movably mounted, the rollers being mounted on a roller carrier interposed between the plates.

A further object of this invention is to provide in a device of this kind an improved means in the form of a roller carrier which has combined therewith means for taking up the thrust between the two plates.

A further object of this invention is to provide an improved means for locking the plates forming the chuck together.

To the foregoing objects and others which may hereinafter appear, the invention consists of the novel construction, combination and arrangement of parts as will be more specifically referred to and illustrated in the accompanying drawing, but it is to be understood that changes, variations and modifications may be resorted to which fall within the scope of the invention as claimed.

Figure 1 is a vertical sectional view, partly in elevation, of a drill chuck constructed according to an embodiment of this invention.

Figure 2 is a sectional view taken on the line 2—2 of Figure 1.

Figure 3 is a sectional view taken on the line 3—3 of Figure 1.

Figure 4 is a horizontal sectional view taken substantially in the plane of Figure 2 and looking downwardly on the roller carrier.

Figure 5 is a fragmentary sectional view taken on the line 5—5 of Figure 3.

Referring to the drawing, the numeral 10 designates generally an upper plate which in the present instance is square in plan and which has extending from the upper side thereof, a tapered shank 11. The shank 11 is threaded as at 12 into the upper side of the upper plate 10, and is formed with an annular flange 13, which limits the extension of the threaded portion 12 into the plate 10.

The plate 10 on the lower side thereof is formed with a pair of parallel truncated V-shaped channels 14. The channels 14 provide guide means for rollers, as will be hereinafter described.

A lower plate 15 is disposed below the upper plate 10, being substantially square in plan, and the lower plate 15 has threaded into the lower side thereof as indicated at 16 a substantially cylindrical drill bit chuck 17. The shank 18 of a polygonal drill bit is adapted to engage in the socket or bore 19 of the chuck member 17, and a set screw 20 which is threaded through the side of the chuck 17 tightly holds the shank 18 in the socket or bore 19.

A roller carrier generally designated as 21 is interposed between confronting faces of the plates 10 and 15. The carrier 21 shown in Figure 4 comprises a substantially square plate 22, which is formed with a plurality of holes 23. A roller shaft or pin 24 is adapted to loosely engage in each hole 23, and the shaft 24 is provided at its lower end with a head 25. A lower roller 26 of truncated conical configuration is rotatably mounted on the pin or shaft 24 and engages in an inverted truncated V-shaped guide channel 27 formed in the lower plate 15. There are two of these channels 27 disposed in parallel relation and at right angles to the channels 14. An upper truncated conical roller 28 is mounted on the pin or shaft 24 and engages in one of the guides or keyways 14 of the upper plate 10. A split locking ring 29 engages in an annular groove 30 formed in the pin 24 so as to retain the pin 24 with respect to the plate 22 and hold the rollers 26 and 28 on the pin 24. The upper plate 10 is formed with a channel 31 extending upwardly from the upper wall of the channel 14 so that the upper projecting end of the pin or shaft 24 can freely move lengthwise. The lower plate 15 is also formed with a channel 32, within which the head 25 of the pin loosely engages.

The carrier 21 also includes pairs of right angularly related thrust rollers 33 and 34. The rollers 33 and 34 are of like construction and are each mounted on a pin 35 which is loosely mounted in a slot 36 formed in the plate 22 and extending downwardly from the upper side thereof. One pair of slots 36 opens through the upper side of plate 22 whereas another pair of slots 36ᵃ opens through the lower side of plate 22. The plate 22 is formed with an opening 37 within which each roller 33 is adapted to rotatably engage.

The polygonal drill bit 38 which is formed on the lower end of the shank 18 is adapted to engage in a guide 39 adapted to be clamped or otherwise firmly secured to the workpiece 40. The bit 38 is a three bladed bit where the hole to be drilled is a square hole and the hole 41 in the guide 39 is square so that the bit 38 can freely oscillate within the guide opening 41. It will, of course, be understood that the chuck hereinbefore described can be used with any desired bit other than one for drilling a square hole, and it will be understood that the drill bits have one less blade than the number of sides in the hole provided in the guide or jig.

The lower plate 15 is yieldably held in contact with the roller 34, and the plate 10 is also yieldably held in contact with the roller 33 by means of a spring 42. The spring 42 extends vertically through an opening 43 provided in the upper plate 10, an opening 44 provided in the carrier 21, and an opening 45 provided in the plate 15. The upper end of the spring 42 extends into a recess 46 provided centrally in the lower end of the shank 11, and the upper end of the spring 42 is looped over a transversely extending pin 47, which extends through the flange 13. The lower end of the spring 42 extends into a recess 48 provided in the upper end of the chuck 17, and the lower end of the spring 42 is looped over a pin 49 extending across the recess 48.

In the use and operation of this chuck the shank 11 is inserted in a conventional drill chuck, and the shank 18 of the drill bit 38 is secured by means of the set screw 20 in the chuck 17. The jig or guide 39 is tightly clamped or secured to the workpiece 40, whereupon the bit 38 may be rotated. The opening 41 in the jig 39 has one more side than the bit 38 has blades. In other words, as the blades of the bit 38 total three, the opening 41 will have four sides, the three blades of the bit 38 forming an equilateral triangle. As the bit 38 is being rotated it will oscillate within the polygonal socket 41, this oscillation being accomplished through the medium of the substantially universal coupling between the plate 15 and the plate 10. The provision of the carrier 21 provides a means whereby the rollers 26 and 28 will not be expelled from the guide channels or keyways as the chuck is being rotated. The rollers 33 and 34 carried by the carrier 21 will take up the thrust between the plates 10 and 15 and will provide for the smooth horizontal movement of the plate 15, in addition to relieving the rollers 26 and 28 and the pin 24 from undue strain by reason of endwise pressure applied to the chuck during the drilling operation. The spring 42 will yieldably hold the parts in assembled relation, and will also act as a means to limit the lateral movement of plate 15 with respect to plate 10.

What I claim is:

1. A polygonal drill bit chuck comprising an upper and a lower plate, each plate having a pair of truncated V-shaped channels with the channels of one plate at right angles to the channels of the other plate, a shank extending from the upper side of said upper plate, a roller carrier interposed between said plates including an intermediate plate and rollers carried by said intermediate plate engaging in said channels, and a bit chuck carried by said lower plate.

2. A polygonal drill bit chuck as set forth in claim 1 including rotatable thrust members carried by said roller carrier.

3. A polygonal drill bit chuck as set forth in claim 1 including a centrally disposed spring connected at one end to said shank and connected at the opposite end thereof to said chuck.

4. A polygonal drill bit chuck as set forth in claim 1 including right angularly related pairs of thrust rollers carried by said intermediate plate and engaging the adjacent inner faces of said upper and lower plates.

5. A polygonal drill bit chuck comprising upper and lower plates and an intermediate plate, a shank extending upwardly from said upper plate, a bit chuck extending downwardly from said lower plate, said upper plate having a pair of parallel truncated V-shaped channels in the lower side thereof, and said lower plate having a pair of truncated V-shaped channels in the upper side thereof, said intermediate plate having a plurality of openings therethrough, roller shafts extending through said openings, and upper and lower truncated conical rollers carried by said shafts and engaging in said channels, said rollers and channels providing means whereby said lower plate may have substantially universal movement in a horizontal plane.

6. A polygonal drill bit chuck as set forth in claim 5 including a plurality of thrust members carried by said intermediate plate and engaging the inner sides of said upper and lower plates.

7. A polygonal drill bit chuck as set forth in claim 5 including a spring secured between said shank and said bit chuck.

FRED R. WAHL.